(12) United States Patent
Marcellin-Dibon et al.

(10) Patent No.: US 11,999,453 B2
(45) Date of Patent: Jun. 4, 2024

(54) PROTECTIVE MASK, IN PARTICULAR DIVING MASK, WITH OPTICAL DISPLAY SYSTEM

(71) Applicant: Microoled, Grenoble (FR)

(72) Inventors: Eric Marcellin-Dibon, Vaucresson (FR); Philippe Renaud-Goud, Grenoble (FR); Cédric Siourakan-Badalou, Grenoble (FR)

(73) Assignee: Microoled, Grenoble (FR)

( * ) Notice: Subject to any disclaimer, the term of this patent is extended or adjusted under 35 U.S.C. 154(b) by 733 days.

(21) Appl. No.: 15/734,919

(22) PCT Filed: Jun. 6, 2019

(86) PCT No.: PCT/FR2019/051359
§ 371 (c)(1),
(2) Date: Dec. 3, 2020

(87) PCT Pub. No.: WO2019/234361
PCT Pub. Date: Dec. 12, 2019

(65) Prior Publication Data
US 2021/0229786 A1    Jul. 29, 2021

(30) Foreign Application Priority Data
Jun. 7, 2018 (FR) ...................................... 1854933

(51) Int. Cl.
*B63C 11/12*        (2006.01)
*G02B 27/01*        (2006.01)
(52) U.S. Cl.
CPC .......... *B63C 11/12* (2013.01); *G02B 27/0172* (2013.01); *G02B 27/0176* (2013.01); *B63C 2011/121* (2013.01); *G02B 2027/011* (2013.01)

(58) Field of Classification Search
CPC .... G02B 21/006; G02B 21/008; G02B 21/28; G02B 21/62; G02B 21/208;
(Continued)

(56) References Cited

U.S. PATENT DOCUMENTS 4,081,209 A    3/1978   Heller et al.
5,886,822 A *  3/1999   Spitzer ................. G02B 27/145
                                                    359/633
(Continued)

FOREIGN PATENT DOCUMENTS

DE    102011082208    9/2011
EP    0583116         2/1994
(Continued)

OTHER PUBLICATIONS

International Search Report for PCT Application No. PCT/FR2019/05139, Feb. 19, 2019.

*Primary Examiner* — Sultan Chowdhury
(74) *Attorney, Agent, or Firm* — Mohr Intellectual Property Law Solutions, PC

(57) ABSTRACT

Protective mask (1) comprising a frame (5) for mounting on a user's face, a window (2) carried by said frame, an optical display system (10) which is capable of projecting an image, and a prism (20) capable of receiving said image from said display and forwarding it, characterised in that the prism (20) has a first (21) and a second (22) active face and a basal face (23), the window having, on its inner face (3), a projection area (30), and said display and said prism are configured so that said display projects said image onto the first active face (21), the image crosses the prism and is reflected by the basal face (23) to the second active face (22), the image is projected from said second active face (22) onto said reflection area (30) of said window (2), and said window projects said image into a user's eye.

12 Claims, 3 Drawing Sheets

(58) Field of Classification Search
CPC ........ G02B 21/2066; G02B 2027/0107; G02B 2027/0109; G02B 2027/011; G02B 2027/0136; G02B 2027/0178; G02B 2027/0179; G02B 27/01; G02B 27/10; G02B 27/017; G02B 27/0101; G02B 27/0149; G02B 27/0172; G02B 27/0176; G02B 27/0178; G02B 27/0972; B63C 2011/121; B63C 2011/123; B63C 2011/126; B63C 11/02; B63C 11/06; B63C 11/12; B63C 11/22

See application file for complete search history.

(56) References Cited

U.S. PATENT DOCUMENTS

| | | | |
|---|---|---|---|
| 6,447,115 | B1 | 9/2002 | Gallagher et al. |
| 7,038,639 | B1 | 5/2006 | Olstad et al. |
| 8,082,922 | B2 | 12/2011 | McWilliams |
| 9,001,005 | B2 * | 4/2015 | Abdollahi .......... G02B 27/0176 345/7 |
| 9,096,166 | B2 | 6/2015 | Abdollahi et al. |
| 2006/0228073 | A1 * | 10/2006 | Mukawa .................. G02B 5/18 385/31 |
| 2009/0059501 | A1 * | 3/2009 | Yamaguchi ........ G02B 27/0176 361/679.3 |
| 2015/0235426 | A1 * | 8/2015 | Lyons ..................... A63F 13/26 345/8 |
| 2017/0146809 | A1 * | 5/2017 | Furuya ................. G03B 21/625 |

FOREIGN PATENT DOCUMENTS

| | | |
|---|---|---|
| WO | 1990001717 | 2/1990 |
| WO | 200200299 | 1/2002 |
| WO | 2011044680 | 4/2011 |
| WO | 2011085501 | 7/2011 |

* cited by examiner

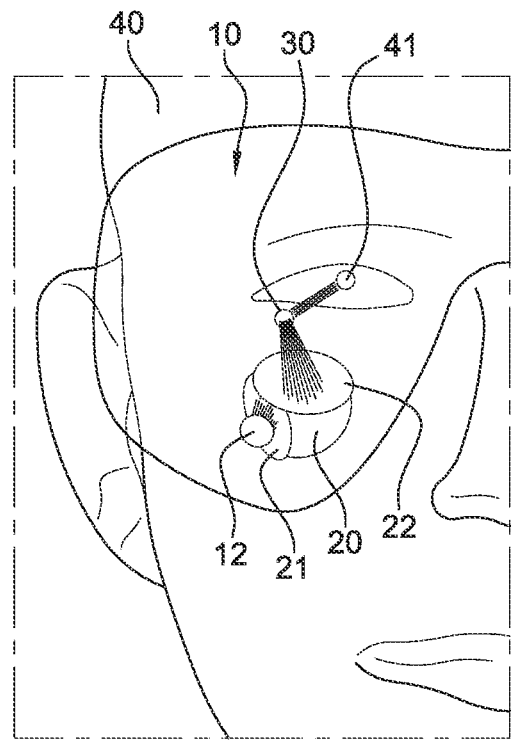
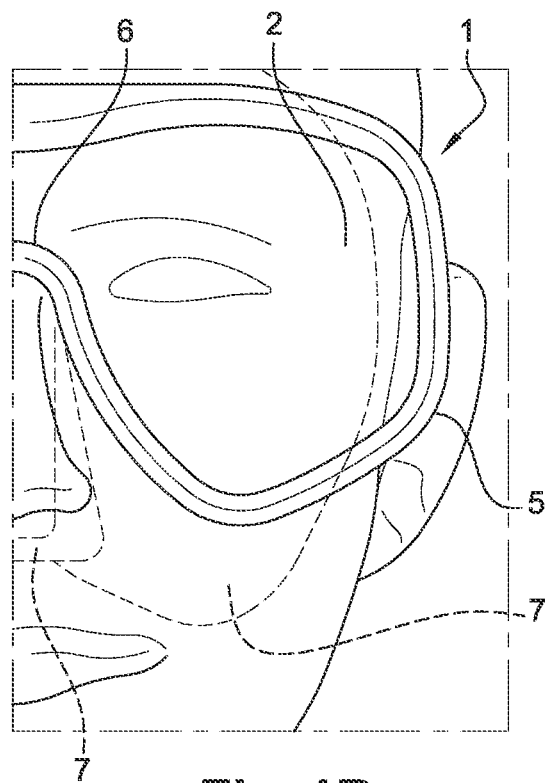
Fig. 1A  Fig. 1B
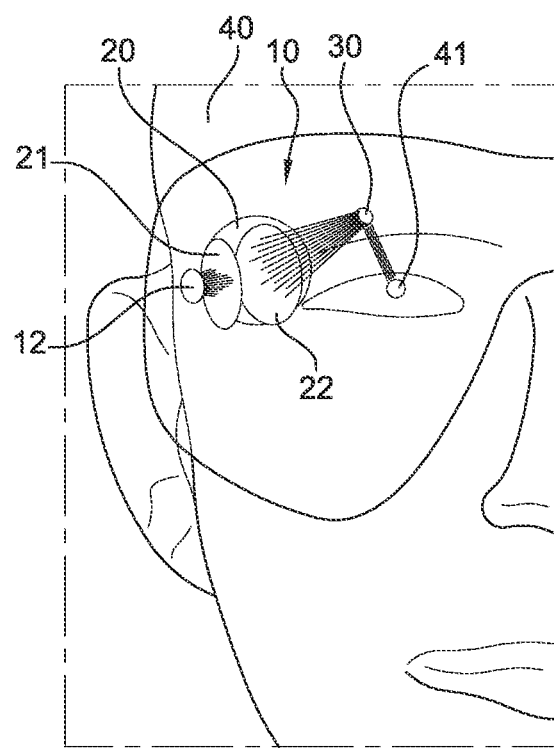
Fig. 1C

PROTECTIVE MASK, IN PARTICULAR DIVING MASK, WITH OPTICAL DISPLAY SYSTEM

CROSS REFERENCE TO RELATED APPLICATIONS

This application claims priority to copending Patent Cooperation Treaty Application No. PCT/FR2019/051359, filed on Jun. 6, 2019, which claims priority to French Patent Application No. 1854933, filed on Jun. 7, 2018, the applications of which are hereby incorporated by reference for all purposes.

TECHNICAL FIELD OF THE INVENTION

The invention relates to the field of optical systems, and more particularly optical display systems. The invention relates to an optical display system integrated in a protective mask (referred to as "smart mask"). Such a mask may in particular be a diving mask or a protective mask.

PRIOR ART

Generally, diving masks must withstand high pressure and are thus fairly bulky; this limits the field of vision of the external environment. Integrating a vision system in a diving mask is also subject to constraints of space requirement. Various models of diving mask are known, making it possible to display information or images with a head-up display, referred to as HUD vision. One example is the Oceanic Datamask™ system that is commercially available. A large number of patent documents propose different configurations. These solutions as a general rule lead to diving masks that are fairly bulky and heavy, which represent specific objects not lending themselves to normal use.

The documents U.S. Pat. Nos. 6,447,115 and 7,038,639 (US Navy) and U.S. Pat. No. 8,082,922 (Dräger Safety) propose positioning the display system in the bottom corner of the mask. This system is particularly bulky, since the display limits the field of vision of the user. The optical path in this configuration is a direct view on the display. With similar geometry, the documents WO 2011/044680 and WO 2011/085501 (Intel) propose using a miniaturized display, which reduces the impact of the system on the field of vision, as well as on the size of the mask in itself. WO 90/01717 (GEC Marconi) and U.S. Pat. No. 4,081,209 (Elliott) describe pilot helmets with internal display that projects the image onto the concave window.

The encumbrance of the inside of the mask by the display system can be avoided if the display is offset outside the mask. This is described in the U.S. Pat. Nos. 9,001,005 and 9,069,166 (Intel). In both cases the optical path is the same, namely the direct vision of the display. Such an external display may also limit the field of vision. Moreover, the image passes through the window and undergoes diffraction and reflection, which may reduce the sharpness and brightness thereof. In all cases, an external display system must be protected in order to be able to withstand the external environment (water pressure, heat, smoke, depending on the type of helmet); this makes the system fairly complex, both on the mechanical level and on the electrical level.

Another system with external display is described in DE 102 011 082 208 (Carl Zeiss); it proposes diving goggles comprising a display and a prism outside. The image is conveyed in the plane of the window towards the eye of the user by multiple reflection inside the window of the mask. The regions of propagation of the image result from a specific localized treatment of the window by the deposition of optical layers that are relatively complex to implement.

Finally, the diving mask described in WO 2002/00299 (Comsonic Trilithic) describes an offset display with integrated prismatic projection, disposed on the window. The image is projected onto the prism and sent directly towards the eye of the user.

The advantage of the optical display systems disposed outside the mask is that they do not encumber the space inside the mask. The drawback thereof is that they are fairly bulky and heavy, since it is necessary to encapsulate them hermetically against water pressure and mechanical damage. Because of this they limit, the field of vision of the user through the outside of the mask. Moreover, the direct projection into the eye of the user requires an effort of focusing with the eye, which contributes to ocular fatigue.

One aim of the present invention is to at least partially remedy the drawbacks of the prior art mentioned above.

Another aim of the invention is to propose a head-up display system that is robust and compact, and is located entirely inside the mask.

Another aim is to propose a simple display system that ensures good image quality, capable of generating an image that is located in the field of vision of the user.

Another objective of the invention is to propose a display system that can be used with flat windows.

OBJECTS OF THE INVENTION

According to the invention the problem is solved by a compact display system including two optical components, namely a microdisplay of the OLED type, and a prism. The latter magnifies the image received by the microdisplay and projects it onto the internal face of the window of the mask. The user sees the image in reflection on the window, directly in his field of vision. For use with a diving mask, no particular optical treatment of the window of the mask is necessary, since the optical index of the face of the glass (approximately 1.46) is relatively well adapted to the optical index of water (approximately 1.34), and therefore no parasitic reflections are observed.

A first object of the invention is a protective mask, in particular a diving mask, comprising:
  a frame able to be mounted on the face of a user,
  a window carried by said frame,
  an optical display system, which comprises
    a display capable of projecting an image, and
    a prism capable of receiving said image from said display and forwarding it, characterized in that
  the prism has a first and a second active face and a basal face,
  the window is a flat window that, on the internal face thereof, has a reflection area, and
  said display and said prism are configured and disposed so that
    said display projects said image onto the first active face of the prism,
    the image passes through the prism and is reflected by the basal face of the prism towards the second active face,
    the image is projected from said second active face of the prism onto said reflection area of said window,
    said window sends said image into the eye of the user, and
    a lens is placed on the optical path between the prism and said reflection area.

Preferably, the two active faces of the prism magnify the image of the display and form a virtual image at a certain distance from the user.

Said first and second active lateral faces extend from a basal face and join at the top of the prism. Said prism typically comprises, apart from said first and second active lateral faces, at least one and in particular two other inactive lateral faces, each inactive lateral face extending from said basal face and joining at said top point or top edge or top surface.

In one embodiment, at least one of said first and second active faces is convex and/or aspherical.

In another embodiment, one from among the display and the prism is fixed to the internal face of the window, whereas the other one from among the display and the prism is fixed to the frame; the prism may be fixed to the internal face of the window with its top.

The mask may comprise a single optical display system disposed in front of one of the eyes of the user, or two optical display systems, each of said optical systems being disposed in front of a respective eye of the user. It is also possible to dispose two optical display systems in front of the same eye of the user.

Said lens of the optical system of the mask may be of the biconvex, plano-convex, plano-concave, biconcave or meniscus type; it is also possible to use an association of lenses, forming for example a doublet.

Another object of the invention is a single-piece optical system for a protective mask, in particular a diving mask, said mask comprising a frame suitable for being mounted on the face of a user and a window carried by said frame, said optical display system comprising
  a display capable of projecting an image,
  a prism capable of receiving said image from said display and sending said image in the direction of the window, said prism having a first and a second active face,
  a lens placed on the optical path between the prism and said reflection area,
  means for attaching to the frame or the window of said mask.

Said lens has an optical function of convergence and correction of the beam. Said single-piece optical system is advantageously watertight; said lens may also fulfill a function of sealing screen of the single-piece optical system.

DESCRIPTION OF THE FIGURES

FIGS. 1 to 4 illustrate embodiments of the invention. They are given by way of examples and do not limit the scope of the invention.

FIG. 1 is a front view of a mask according to the invention. It shows two different views of the same embodiment (FIGS. 1A and 1C on the one hand, FIG. 1B on the other hand).

FIG. 2 is a schematic view of the optical display system of a mask according to FIG. 1; it does not show the optical paths.

FIG. 3 is a schematic view of an optical display system according to another embodiment, which includes a lens between the prism and the window.

FIG. 4 shows three views of a mask that uses the optical display system of FIG. 3.

Figure 2:
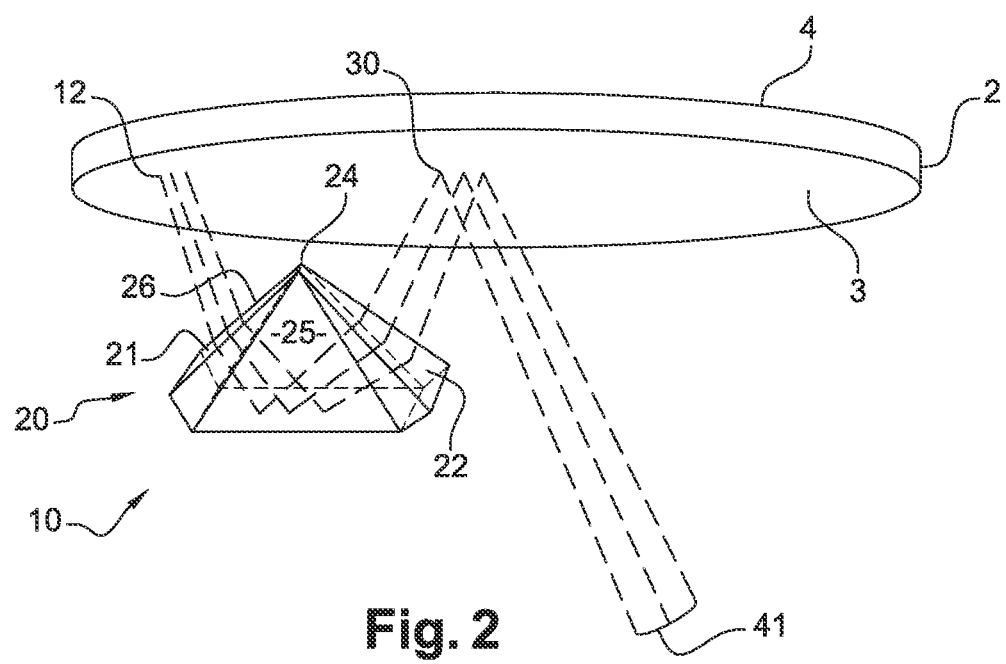

The following numerical references are used in the present description:

| | |
|---|---|
| 1 | Mask |
| 2 | Window |
| 3 | Internal face of window 2 |
| 4 | External face of window 2 |
| 5 | Frame of the mask 1 |
| 6 | Passage for the nose |
| 7 | Sealing means |
| 10 | Optical display system |
| 12 | Display |
| 20 | Prism |
| 21 | First active face of the prism 20 |
| 22 | Second active face of the prism 20 |
| 23 | Basal face of the prism 20 |
| 24 | Top of the prism |
| 25 | First lateral face of the prism 20 |
| 26 | Second lateral face of the prism 20 |
| 27 | Curved surface (optical surface) |
| 28 | Lens |
| 30 | Reflection area on the window 2 |
| 40 | Head of the user |
| 41 | Eye of the user |
| 42 | Single-piece optical system |

DETAILED DESCRIPTION

FIG. 1 shows a typical embodiment of a mask according to the invention. FIG. 1B shows solely (and schematically) the general aspects of the mask, with the frame thereof and the means for making the mask watertight, while FIGS. 1A and 1C show solely (and schematically) the optical components of the mask, but not the frame thereof.

The mask 1 comprises a window 2 held by a frame 5, all visible solely in FIG. 1B. FIG. 1 does not show other essential but known elements of the mask, such as its means for fixing on the head 40 of the user; the means for making the mask watertight are sketched schematically and bear the reference 7. The window 2 has an internal face 3 and an external face 4, both visible in FIG. 2. The internal face 3 may be flat or slightly curved. Likewise, the external face 4 may be flat or slightly curved. The frame 1 according to this embodiment has a passage 6 for the nose; this is advantageous since in this way the window 2 is located closer to the eye 41 of the user. However, the present invention may also be implemented for a mask that does not have a passage for the nose.

According to the invention, the mask 1 has an optical display system 10 visible solely in FIGS. 1A and 1C. This system 10 is disposed inside the mask 1. It comprises a display 12 and a prism 20. The optical display system 10 according to the invention can be positioned in various ways, and FIGS. 1A and 1C show two possibilities: in FIG. 1A the display 12 is located on a horizontal axis with the prism 20, while in FIG. 1C the display 12 is located on an axis close to a horizontal axis with the prism 20. In both cases the projection area 30 is located on the internal face 3 of the window 2.

The display 12 is advantageously a microdisplay of the OLED (organic light emitting diode) type, known per se. The prism 20, more clearly visible in FIG. 2, comprises a base or basal face 23, rectangular in shape in plan view. The lateral faces of the prism extend from the base 23 and join at a top edge 24 (referred to as the "refringent edge"). Two first opposite faces can be seen, referred to as active faces or optical surfaces 21 and 22, as well as two other opposite faces, referred to as inactive faces 25 and 26. The inactive lateral faces 25, 26 do not participate in the optical effect of the optical display system according to the present invention.

Advantageously at least one, and preferably both, of said active faces 21, 22 are not flat but convex or concave; this leads to a magnification of the image. Even more preferably, at least one of these convex optical faces 21, 22 is aspherical. This makes it possible to correct for optical aberrations and reduces distortions of the image.

In the embodiment according to FIGS. 1 and 2, the optical display system 10 does not comprise any other optical component.

As is shown schematically in FIG. 2, the display 12 and the prism 20 are configured and disposed so that the display 12 (shown in FIG. 2 only as a starting point for the optical beams, and being located close to the internal face 3 of the window 2) projects its image onto the first convex face 21 of the prism 20, and so that the prism 20 projects the image, reflected on the basal face 23, from its second convex face 22 onto a reflection area 30 of the internal face 3 of the window 2. Inside the prism 20 the image is refracted from the first active face 21 towards the basal face 23, and then reflected on the basal face 23 towards the second active face 22. The image projected from the second active face 22 onto the internal face 3 of the window 2 is reflected into the eye 41 of the user. The use of the prism 20 with two convex contiguous faces 21, 22 leads to the magnification of the image.

In the embodiment according to FIG. 1, the mask 1 according to the invention has a single optical display system 10 disposed in front of one of the eyes 41 of the user. According to another embodiment, not shown in the figures, the mask 1 comprises two optical display systems 10, one for (and in front of) each eye 41 of the user. According to yet another embodiment, not shown in the figures, the mask comprises two optical display systems for (in front of) the same eye of the user, in this case, one of said optical systems is typically disposed at the top of the window and the other at the bottom of the window.

Generally, the display 12 may be fixed to the internal face 3 of the window 2 (as in FIG. 1) or on the frame 5 (a variant not shown in the figures). The prism 20 may be fixed to the internal face 3 of the window 2 or to the frame 5, using suitable fixing means. In each of these two cases said fixing means may also fix the display 12; in this variant the display 12 and the prism 20 may form a single block, held together and fixed on the internal face 3 of the window 2 or on the frame 5 by a common fixing means. In another variant the prism 20 is fixed to the internal face 3 of the window 2 with the top 24 of the prism. According to the form of the prism 20, this top 24 may be a top point, a top edge (refringent), or a top surface. In the latter variant the prism 20 may be as close as possible to the window 2 in order to minimize the space requirement of the optical display system 10; the fact that the top 24 of the prism touches the internal face 3 of the window 2 does not necessarily interfere with the functioning of the prism 20.

As mentioned above, the lateral faces 25, 26 of the prism 20 do not participate in the optical effect of the prism 20 and of the optical display system. They may be flat, concave or convex; they may be painted black and/or serve as a support or mechanical gripping face for positioning the prism 20 when it is mounted in the mask 1. In another embodiment, said fixing means are attached to at least one of the side faces 25, 26 of the prism 20.

Figure 3:
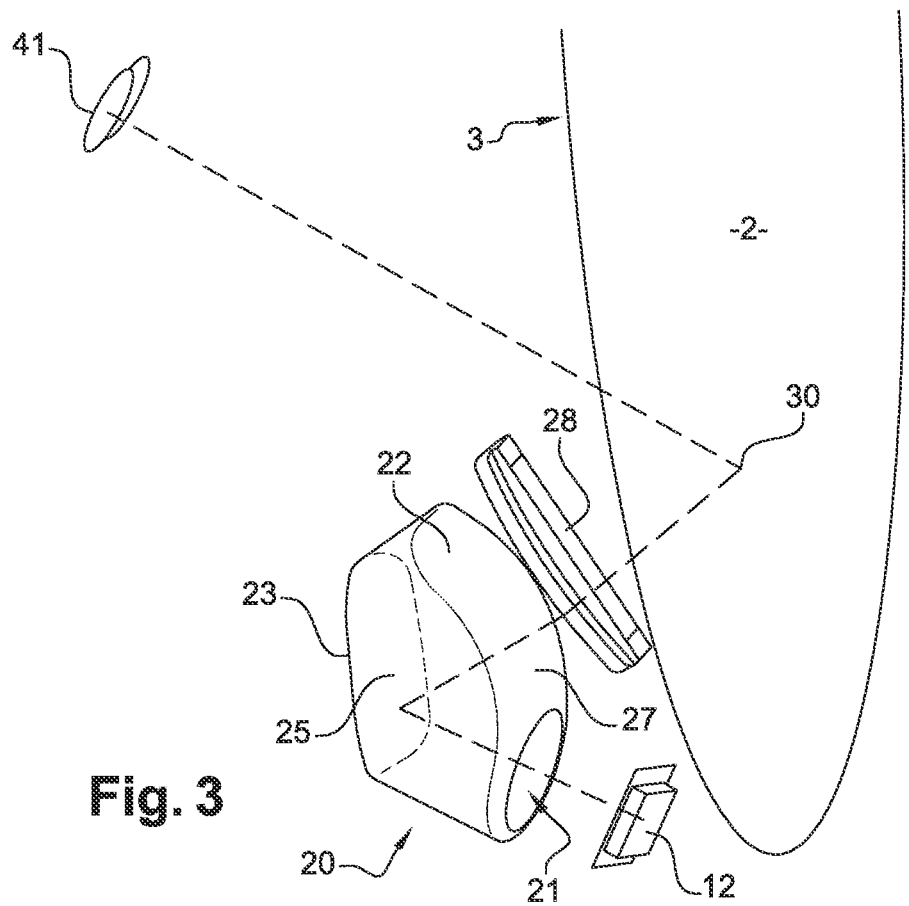

FIG. 3 illustrates schematically another embodiment of the optical display system according to the invention, wherein a lens 28, which may be plano-convex, is located on the optical path between the prism 20 and the internal face 3 of the window 2. It can improve the focusing of the virtual image. In the case where the display 12 and the prism 20 form a single-piece system 42, said lens 28 can serve as a sealing screen. It will be noted that, in the embodiment in FIG. 3, the two optical surfaces of the prism form a single curved surface 27 that is oriented towards the internal surface 3 of the window 2; this prism does not have any refringent edge. Obviously, it is possible to use such a prism wherein the two optical surfaces are represented by a single curved surface, which is typically aspherical, in all the embodiments of the invention.

Figure 4A:
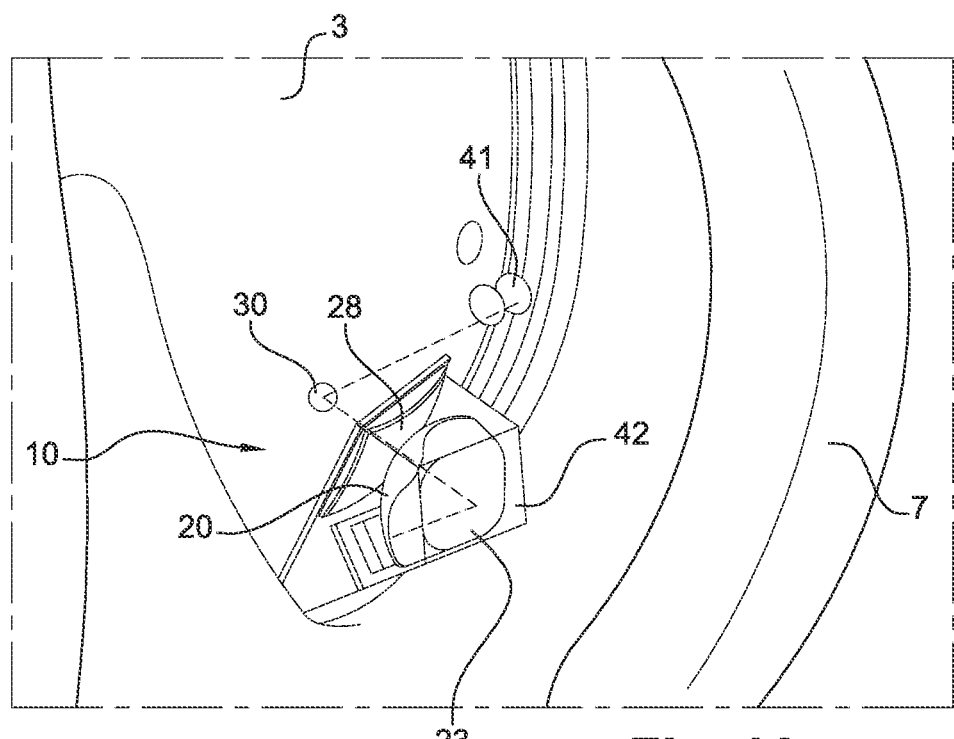
FIG. 4(a) is a front view of the mask, FIG. 4(b) a view of the inside that shows the optical display system in transparency.
Figure 4B:
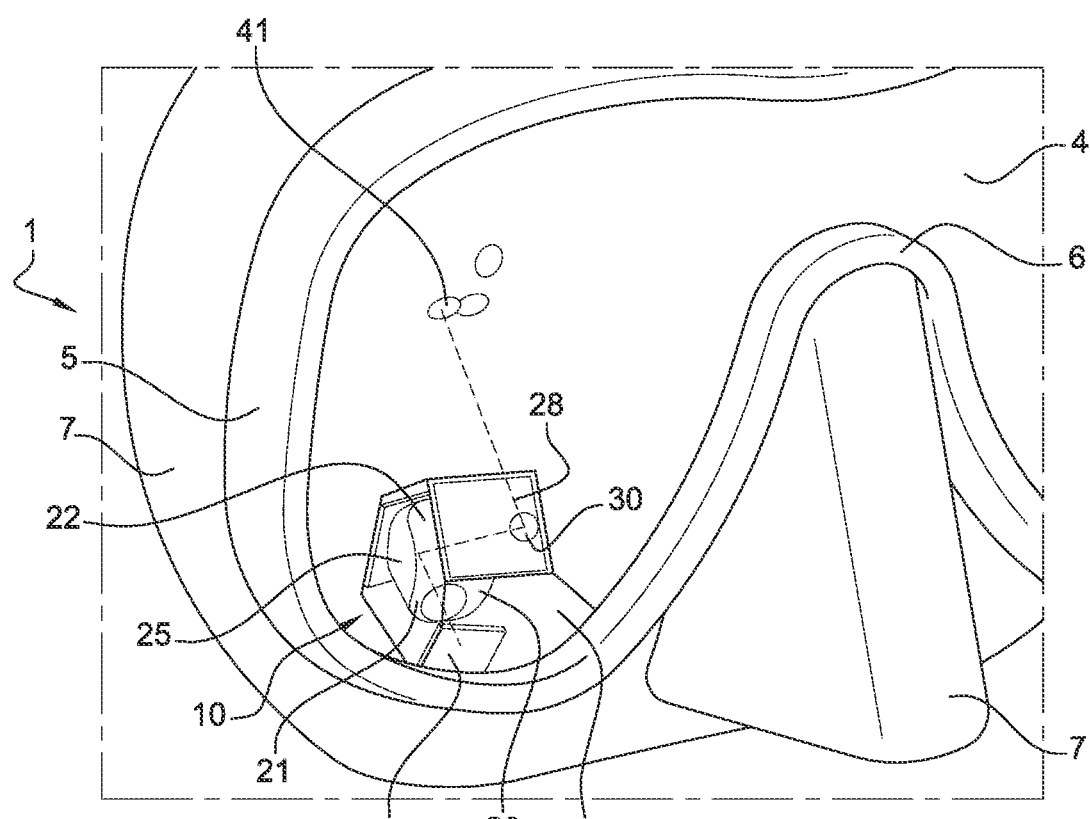

FIG. 4 shows two different views of a single-piece system as described in relation to FIG. 3, namely a view of the inside of the mask (FIG. 4A) and a view of the outside (FIG. 4B). The single-piece system 42 (shown in transparency in order to depict the optical components thereof) can be seen. The lens 28 forms a sealing screen; it is located at a short distance from the window 2. Three different positions of the pupil 41 of the user are shown. This single-piece system may be fixed to the window 2 or to the frame 6.

The invention can be implemented with any mask of a known type, and in particular with diving masks and protective masks. These masks comprise at least one window 2, and may comprise a frame 5. They may have a passage for the nose 6 or not; in the first case the window 2 is closer to the eye 41 of the user than in the second case, and the present invention, which makes it possible to reduce the size of the optical display system 12, will be all the more advantageous. The protective masks may for example be diving masks, self-contained respiratory masks, pilot masks, or welder masks, masks protecting against splattering. Masks are preferred in which the window 2 is flat, which do not cause distortion of the image.

The mask according to the invention makes it possible to display all types of information, in alphanumeric form and/or in the form of images, in one or more colors, which are visible to the user and which are superimposed on his normal vision through the window. This information may be of various natures and may be supplied by sources or sensors of different natures, and may relate for example to the measurement of time (in particular the time of day, the time elapsed since point zero, the time remaining until an event to occur), the measurement of space (in particular the diving depth, the compass direction, the position), the resource reserves carried by the user (in particular compressed air, oxygen, electrical energy), the environment (in particular the outside temperature, the $CO_2$ level, the oxygen level, the CO level, distances with respect to obstacles, visibility, images coming from a camera carried by the user), information and instructions received from an external transmitter (for example information on dangers not visible to the user, instructions given to the user), graphs (for example diving curves, decompression curves).

The mask 1 according to the invention has many advantages. By virtue of the projection of the image onto the internal face 3 of the window 2, no focusing effort is required of the user since the projected image is superimposed on his natural vision. The prism 20 of the optical display system concentrates the majority of the optical functions: it magnifies the image and makes it possible to project it onto a refection area 30 that is sufficiently large to enable perception thereof by the user of the mask with good visual comfort. The beam is bent in the prism, without any risk of disturbance of the reflecting surfaces, and the image is converged and corrected by virtue of the two non-planar beam entry and exit faces. Thus the optical display system is very compact, and consequently the total field of vision of the wearer of the mask is not reduced. Thus the direct vision of the user is very little obstructed by the optical system. Installing the optical system inside the mask 1 does not require increasing the distance between the eye 41 and the window 2.

The optical display system according to the invention is particularly simple, and can be mounted directly on a diving mask of a normal type, provided with a flat window. It is not necessary to modify the mask, and its functions of protection and watertightness are preserved. The window does not have an active optical function, it simply acts as a specular reflection surface. Compared with masks in which the window is curved, adding the display system requires neither precise control of the concavity nor individual adjustment of the display system to the concavity of the window. The display system according to the invention is particularly compact, and can easily be fixed to the flat window by adhesive bonding (which may be more difficult in the case of a curved window).

In one embodiment a functional coating is added to the internal surface of the window. This coating may be of a known type. It may be a coating with an optical function, for example a wide-band reflective coating (such as a metal layer or a dielectric layer), or a narrow-band reflective coating centered on the emission wavelength of the display (typically a dielectric layer. It may be a coating that combines one of these optical functions with one or more other functions, in particular an anti-mist function, a non-scratch function or an oleophobic function.

The electrical consumption of an optical display system provided with a microdisplay based on OLED is very much reduced. The electrical supply of the display may be a battery; it may be positioned for example in the optical unit.

The optical display system according to the invention can fit on existing masks, and it is not normally necessary to modify the design thereof. This represents an important advantage since, these masks being very special products, any substantial modification to the mask, to the window thereof or to the shell thereof would give rise to a significant cost.

In a variant that is not shown in the figures, the single-piece system 12 according to the invention also comprises an addressing microprocessor and/or a rechargeable current source that supplies the display and, if such is present, the microprocessor.

The prism 20 may be produced from a suitable transparent plastics material, for example by known molding or injection techniques. It is also possible to use a glass prism, for example made from molded glass, with polished active faces.

The invention claimed is:

1. A protective mask, in particular a diving mask, comprising:
    a frame able to be mounted on the face of a user;
    a window carried by said frame;
    an optical display system, which comprises:
        a display capable of projecting an image, and
        a prism capable of receiving said image from said display and forwarding it;
    characterized in that;
        the prism has a first active face and a second active face and a basal face;
        the window is a flat window that, on the internal face thereof, has a reflection area; and
        said display and said prism are configured and disposed so that:
            said display projects said image onto the first active face of the prism,
            the image passes through the prism and is reflected by the basal face of the prism towards the second active face,
            the image is projected from said second active face of the prism onto said reflection area of said window
        said window sends said image into the eye of the user, and
        a lens is placed on the optical path between the prism and said reflection area, wherein the prism comprises, apart from said first active face and said second active face two other inactive lateral faces each inactive lateral face extending from said basal face and joining at a top of the prism.

2. The protective mask according to claim 1, characterized in that at least one of said first active face and said second active face is convex.

3. The protective mask according to claim 1, characterized in that at least one of said first active face and said second active face is aspherical.

4. The protective mask according to claim 1, characterized in that said first active face and said second active face extend from the basal face and join at a top of the prism.

5. The protective mask according to claim 1, characterized in that said prism is fixed to the internal face of the window at a top of the prism.

6. The protective mask according to claim 1, characterized in that the protective mask comprises a single optical display system disposed in front of one of the eyes of the user.

7. The protective mask according to claim 1, characterized in that said lens is of the plano-convex type.

8. The protective mask according to claim 1, characterized in that it is a diving mask, a self-contained respiratory protection mask, a pilot mask, a welder mask or a mask for protection against splattering.

9. The protective mask according to claim 1, characterized in that the protective mask comprises two optical display systems, each of said optical systems being disposed in front of a respective eye of the user.

10. A protective mask, in particular a diving mask, comprising:
    a frame able to be mounted on the face of a user;
    a window carried by said frame;
    an optical display system, which comprises:
        a display capable of projecting an image, and
        a prism capable of receiving said image from said display and forwarding it;
    characterized in that;
        the prism has a first active face and a second active face and a basal face;
        the window is a flat window that, on the internal face thereof, has a reflection area; and
        said display and said prism are configured and disposed so that:
            said display projects said image onto the first active face of the prism,
            the image passes through the prism and is reflected by the basal face of the prism towards the second active face,
            the image is projected from said second active face of the prism onto said reflection area of said window said window sends said image into the eye of the user, and a lens is placed on the optical path between the prism and said reflection area, wherein one of the display and the prism is fixed to the internal face of the window, whereas the other one of the display and the prism is fixed to the frame.

11. A single-piece optical system for a protective mask, said protective mask comprising a frame suitable for being mounted on the face of a user and a window carried by said frame, said single-piece optical display system comprising;

a display capable of projecting an image;

a prism capable of receiving said image from said display and sending said image in the direction of the window, said prism having a first active face and a second active face;

a lens placed on an optical path between the prism and a reflection area; and means for attaching to the frame or the window of said mask, one of the display and the prism is fixed to the internal face of the window, whereas the other one of the display and the prism is fixed to the frame.

12. The single-piece optical system according to claim 11, wherein said lens fulfils a function of a sealing screen.

* * * * *